United States Patent
Wang et al.

(10) Patent No.: US 12,304,070 B2
(45) Date of Patent: May 20, 2025

(54) GRASP TEACH BY HUMAN DEMONSTRATION

(71) Applicant: FANUC CORPORATION, Yamanashi (JP)

(72) Inventors: Kaimeng Wang, Fremont, CA (US); Yongxiang Fan, Fremont, CA (US)

(73) Assignee: FANUC CORPORATION, Yamanashi (JP)

(*) Notice: Subject to any disclaimer, the term of this patent is extended or adjusted under 35 U.S.C. 154(b) by 265 days.

(21) Appl. No.: 17/934,808

(22) Filed: Sep. 23, 2022

(65) Prior Publication Data

US 2024/0109181 A1 Apr. 4, 2024

(51) Int. Cl.
| | |
|---|---|
| B25J 9/00 | (2006.01) |
| B25J 9/16 | (2006.01) |
| B25J 19/02 | (2006.01) |
| G06F 17/17 | (2006.01) |
| G06F 18/2413 | (2023.01) |
| G06V 40/10 | (2022.01) |
| G06V 40/20 | (2022.01) |

(52) U.S. Cl.
CPC ........... *B25J 9/0081* (2013.01); *B25J 9/1612* (2013.01); *B25J 9/1697* (2013.01); *B25J 19/023* (2013.01); *G06F 17/17* (2013.01); *G06F 18/24147* (2023.01); *G06V 40/10* (2022.01); *G06V 40/28* (2022.01)

(58) Field of Classification Search
None
See application file for complete search history.

(56) References Cited

U.S. PATENT DOCUMENTS

| | | | | |
|---|---|---|---|---|
| 9,321,176 | B1* | 4/2016 | Sun | B25J 15/0028 |
| 2020/0311397 | A1* | 10/2020 | Sawhney | G06V 10/40 |
| 2020/0316782 | A1* | 10/2020 | Chavez | G06T 7/12 |
| 2020/0361083 | A1* | 11/2020 | Mousavian | G06N 3/063 |
| 2021/0023720 | A1* | 1/2021 | Du | G06T 7/194 |
| 2021/0316449 | A1 | 10/2021 | Wang et al. | |
| 2022/0072707 | A1* | 3/2022 | Fan | G06T 7/73 |
| 2023/0294277 | A1* | 9/2023 | Yang | G05B 19/4155 700/217 |

* cited by examiner

Primary Examiner — Jonathan L Sample
Assistant Examiner — Alan Lindsay Ostrow
(74) Attorney, Agent, or Firm — John A. Miller; Shumaker, Loop & Kendrick, LLP

(57) ABSTRACT

A technique for robotic grasp teaching by human demonstration. A human demonstrates a grasp on a workpiece, while a camera provides images of the demonstration which are analyzed to identify a hand pose relative to the workpiece. The hand pose is converted to a plane representing two fingers of a gripper. The hand plane is used to determine a grasp region on the workpiece which corresponds to the human demonstration. The grasp region and the hand pose are used in an optimization computation which is run repeatedly with randomization to generate multiple grasps approximating the demonstration, where each of the optimized grasps is a stable, high quality grasp with gripper-workpiece surface contact. A best one of the generated grasps is then selected and added to a grasp database. The human demonstration may be repeated on different locations of the workpiece to provide multiple different grasps in the database.

18 Claims, 9 Drawing Sheets

Select Best Grasp (Most Like Human Demonstration) from Multiple Grasp Optimization Results by Minimizing a Cost Function Having Three Parameters:

1) Grasp Position Difference (Grasp-Demo)

$$diff_{distance}(x, y, z)$$

2) Grasp Rotation Difference (Grasp-Demo)

$$diff_{angle}(w, p, r)$$

3) Overlapping Area Between Grasp Region and Gripper $$\frac{1}{S_{area}}$$

GRASP TEACH BY HUMAN DEMONSTRATION

BACKGROUND

Field

The present disclosure relates generally to a method for teaching robot grasping of parts by human demonstration and, more particularly, to a method for robot grasp teaching where a human demonstrates a grasp of a part, images of the demonstration are analyzed to define a hand pose relative to the part, a grasp region on the part is determined by passing a hand plane through the part and selecting nearby surface points, and grasp optimization is employed to determine a best grasp corresponding to the human demonstration.

Discussion of the Related Art

The use of industrial robots to perform a wide range of manufacturing, assembly and material movement operations is well known. One such application is a pick and place operation, such as where a robot picks up individual parts from a bin and places each part at a prescribed location for further processing or packaging. A specific example of a pick and place operation is the machine tending application, where parts or workpieces are dropped into the bin and need to be grasped by the robot and placed into a machining station. The machining station must typically grasp the part in a particular manner in order to allow the machining operations (drilling, milling, thread tapping, etc.) to be performed on the part. This affects how the tending robot can grasp the part in order to load the part into the machining station.

Another example of a pick and place operation is where the robot grasps an individual part from a bin of parts, and places the part on a conveyor for movement to a subsequent station, or in a container for shipping. In these cases, it is still advantageous for the robot to grasp the part in a manner which is suitable for the part being placed on the conveyor or in the container in a specified pose. Because of this, certain regions of the part are preferred for grasping by the pick-and-place robot.

In applications such as described above, a vision system (one or more cameras) is typically used to identify the position and orientation of individual parts in the bin. Then a specific robotic grasp is identified to be used on a selected part, where the grasp may be chosen from a pre-computed database of grasps which have been generated for the particular part geometry and the particular gripper geometry.

Techniques are known in the art for grasp generation. In manual grasp teaching, a production robot is used, and an expert operator uses either a teach pendant or hand guidance to teach the robot to grasp the part. This must be done many times in order to define suitable grasps for the part in many different orientations in the bin. This manual teaching technique is slow and inefficient, and also very costly because it requires a full workcell (with robot and machining station, for example) for teaching, which in turn prevents the workcell from being used for actual part production.

Other grasp generation techniques are known which can automatically generate many grasp candidates. However, these techniques have downsides such as being extremely computationally expensive and slow, or making simplifications which result in computed grasps of low grasp quality. In addition, many existing techniques have no automated way of accounting for the fact that the robot must grasp the part in a particular manner in order to subsequently be able to place the part as required.

Although techniques have lately been developed which overcome the problems with automated grasp generation described above, even these grasp generation techniques cannot account for environmental factors related to the part pickup operation—such as surrounding parts and bin walls, obstacles such as tables and fixtures, nuances of part shape, etc.

In light of the circumstances described above, there is a need for a robot grasp teaching technique which takes advantage of a human expert's knowledge of suitable grasps for a particular application and uses grasp optimization techniques to identify a corresponding high quality, stable grasp.

SUMMARY

In accordance with the teachings of the present disclosure, a technique for robotic grasp teaching by human demonstration is presented. A human demonstrates a grasp on a workpiece, while a camera provides images of the demonstration which are analyzed to identify a hand pose relative to the workpiece. The hand pose is converted to a plane representing two fingers of a gripper, for example. The hand plane is used to determine a grasp region on the workpiece which corresponds to the human demonstration. The grasp region and the hand pose are used in an optimization computation which may be run repeatedly with randomization to generate multiple grasps approximating the demonstration, where each of the optimized grasps is a stable, high quality grasp with surface contact between the gripper and the workpiece. A best one of the generated grasps is then selected and added to a grasp database. The human demonstration may be repeated on different locations of the workpiece to provide multiple different grasps in the database.

Additional features of the presently disclosed methods will become apparent from the following description and appended claims, taken in conjunction with the accompanying drawings.

DETAILED DESCRIPTION OF THE EMBODIMENTS

The following discussion of the embodiments of the disclosure directed to a method for robotic grasp teaching by human demonstration is merely exemplary in nature, and is in no way intended to limit the disclosed techniques or their applications or uses.

The use of industrial robots for picking parts from a source and placing them at a destination is well known. In a typical pick and place operation, a supply of parts is provided in a bin, such as a bin containing a random pile of parts which have been cast or partially assembled, where the parts need to be picked up from their random poses in the bin and placed in a particular pose at a destination location. Machine tending is one type of robotic part picking and placement having unique requirements, while other bin picking and placement applications also typically require the part to be placed in a particular pose at the destination.

Figure 1:
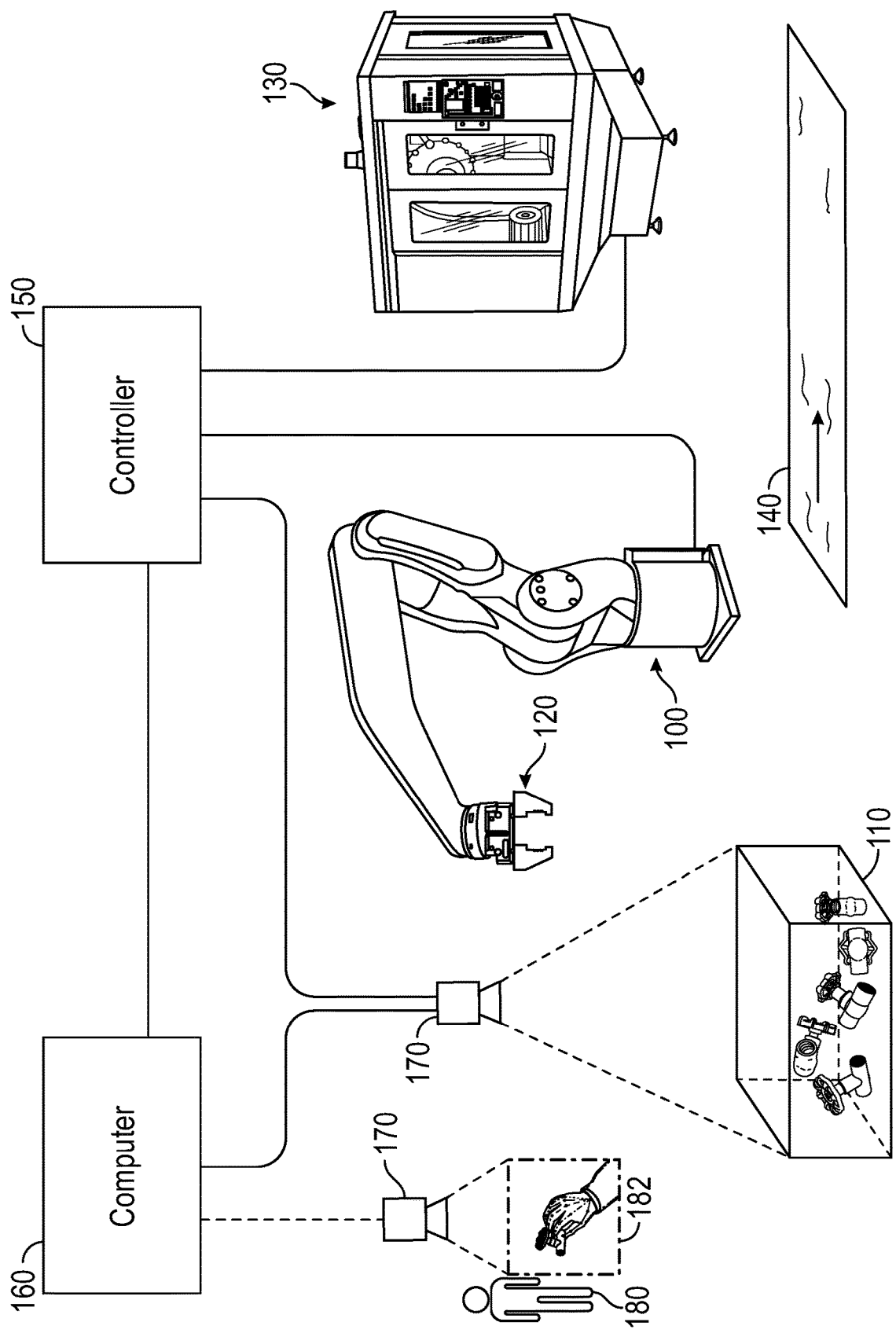
FIG. 1 is an illustration of a grasp teaching and part grasping system, where a human demonstrates grasps on a workpiece which are optimized and added to a grasp database, and an industrial robot picks a workpiece from a bin using one of the grasps from the database and places the workpiece for further processing, according to an embodiment of the present disclosure.

FIG. 1 is an illustration of a robotic grasp teaching and part grasping system, according to an embodiment of the present disclosure. In the system of FIG. 1, a human demonstrates various grasps on a part or workpiece, optimized grasps are computed based on the human demonstration and added to a grasp database, and an industrial robot then picks parts from a bin using one of the grasps from the database and places the parts at a destination location for further processing.

In one application of the system of FIG. 1, an industrial robot 100 picks a part from a bin 110 and places the part in a machining station 130 for processing, then removes the finished part from the machining station 130 after processing and places the finished part on a conveyor 140 where it is carried away for further processing or packaging. In another application of the system, the robot 100 picks a part from the bin 110 and places the part directly on the conveyor 140 to be carried away. The robot 100 has a gripper 120 with fingers which open and close to grasp a part. The fingers typically have a curved contact surface suitable for grasping the parts which are being handled by the robot 100. The gripper finger shape is discussed further below.

Motion of the robot 100 is controlled by a controller 150, which communicates with the robot 100 via a cable (shown) or wirelessly. The controller 150 provides joint motion commands to the robot 100 and receives joint position data from encoders in the joints of the robot 100, as known in the art. The controller 150 also provides commands to control operation of the gripper 120 (grip/ungrip commands and gripper opening width).

During real-time bin picking operations by the system of FIG. 1, whether in a machine tending or other pick and place application, the robot 100 must grasp a selected part from the bin 110—based on images of the bin 110 from a camera 170—such that the gripper 120 closes its fingers on the selected part according to a chosen stable grasp. The grasp includes the position and orientation of the gripper 120 with respect to the selected part, along with a gripper finger width. In order to maximize bin picking productivity, it is known to pre-compute a grasp database containing many high-quality, stable grasps, and one of the grasps from the database is chosen for each part which is selected during real-time bin picking.

A computer 160, including a processor and memory/storage, is in communication with the controller 150. The computer is configured to pre-populate the grasp database based on grasp demonstration by a user 180. The computation of the grasp database is the subject of the present disclosure, and is discussed in detail below.

In one implementation embodiment of the real-time bin picking, the controller 150 performs the part selection and grasp computation based on the images from the camera 170, and using the grasp database transferred from the computer 160. Using the grasp data, the controller 150 computes robot motion instructions which cause the gripper 120 to grasp a part and move the part into the machining station 130 or other destination. The controller 150 then provides instructions to the robot 100 which picks and places the selected part. In this embodiment, the computer 160 is not used for robotic bin picking operations; rather, the computer 160 is used only for grasp generation, and provides the grasp database to the controller 150 in advance of the robotic operations.

In another implementation embodiment, the computer 160 performs the real-time part selection and grasp computation based on the images from the camera 170, and using the grasp database which resides on the computer 160. In this embodiment, the computer 160 communicates the grasp data (gripper position/orientation/width) to the controller 150 for each individual bin pick, and the controller 150 computes robot motion commands and provides instructions to the robot 100 which picks and places the selected part.

Either of the implementation embodiments described above may be used for a particular application, based on specific application requirements, computing power of the controller 150, etc. For the remainder of the discussion which follows, the computer 160 will be described as being used for the grasp teaching by human demonstration according to the present disclosure, while the controller 150 will be described as computing a grasp in real time using the grasp database and controlling the robot to execute the grasp.

The camera 170 is typically a three-dimensional (3D) camera providing both color image data and pixel depth map data, but may be some other type of 3D sensor which provides data suitable for determining the pose (position and orientation) of parts in the bin 110. More than one of the cameras 170 may be used to provide more robust depth and image data which aids in part pose determination, and also allows for non-vertical gripper approach angles. In some applications, the bin 110 may contain only one part, which could be in any position and orientation. This would be the case if the parts are processed by the machining station 130 at the same rate that they arrive in the bin 110. Alternately, the bin 110 may contain several parts (as shown in FIG. 1), or a substantial pile of parts. In any case, a best quality grasp candidate is chosen from the pre-computed grasp database based on the image data from the camera 170.

During real-time operation, the robot 100 grasps a part from the bin 110 and places the part either in the machining station 130 or on the conveyor 140 (or in another destination such as a shipping container), then returns to the bin 110 to select another part using a grasp which is computed based on new image data provided by the camera 170.

Teaching a robot to recognize and grasp an individual part in a bin full of parts, in real time, has always been challenging. In order to improve the speed and reliability of robotic part picking operations, it is known to pre-compute grasps for a specified gripper grasping a particular part in a variety of poses. This pre-computing of grasps is known as grasp generation, and the pre-computed (generated) grasps are then used to make decisions in real time during robotic part picking operations.

Grasp generation techniques are known in the art, but have various shortcomings as discussed earlier. The present disclosure overcomes the shortcomings of existing grasp generation techniques by enabling grasp teaching by human demonstration, where a human demonstrates a grasp on a workpiece, and an optimized, stable, high quality grasp is computed from the images of the human demonstration. This disclosed technique takes advantage of a human's innate understanding of how a part should be grasped, while also using the power of grasp optimization computation to compute a grasp which is not sensitive to inaccuracies in detection of exact finger-workpiece contact locations.

The method for grasp teaching by human demonstration uses the camera 170 (or a different instance of a camera 170) to provide images of the grasp demonstration by a human 180. The grasp demonstration is illustrated in box 182. Using the images of the human hand and the workpiece from the human demonstration, the presently disclosed techniques compute a stable, high quality grasp for each demonstration. The human 180 can demonstrate multiple grasps on various parts of the workpiece in order to provide multiple optimized grasps in a grasp database for later use by the robot 100 and the controller 150.

Various configurations of the system shown in FIG. 1 may be employed. For example, the human demonstration with its camera and computer may be performed in a separate location from the workcell where the robot 100 operates with its controller 150; in this case, the demonstrated and optimized grasps are added to a grasp database which is provided from the computer 160 to the controller 150 for real-time robot operations. Alternately, the human demonstration could be performed in the robot workcell using the same camera and computer which are used for real-time robot operations.

Figure 2:
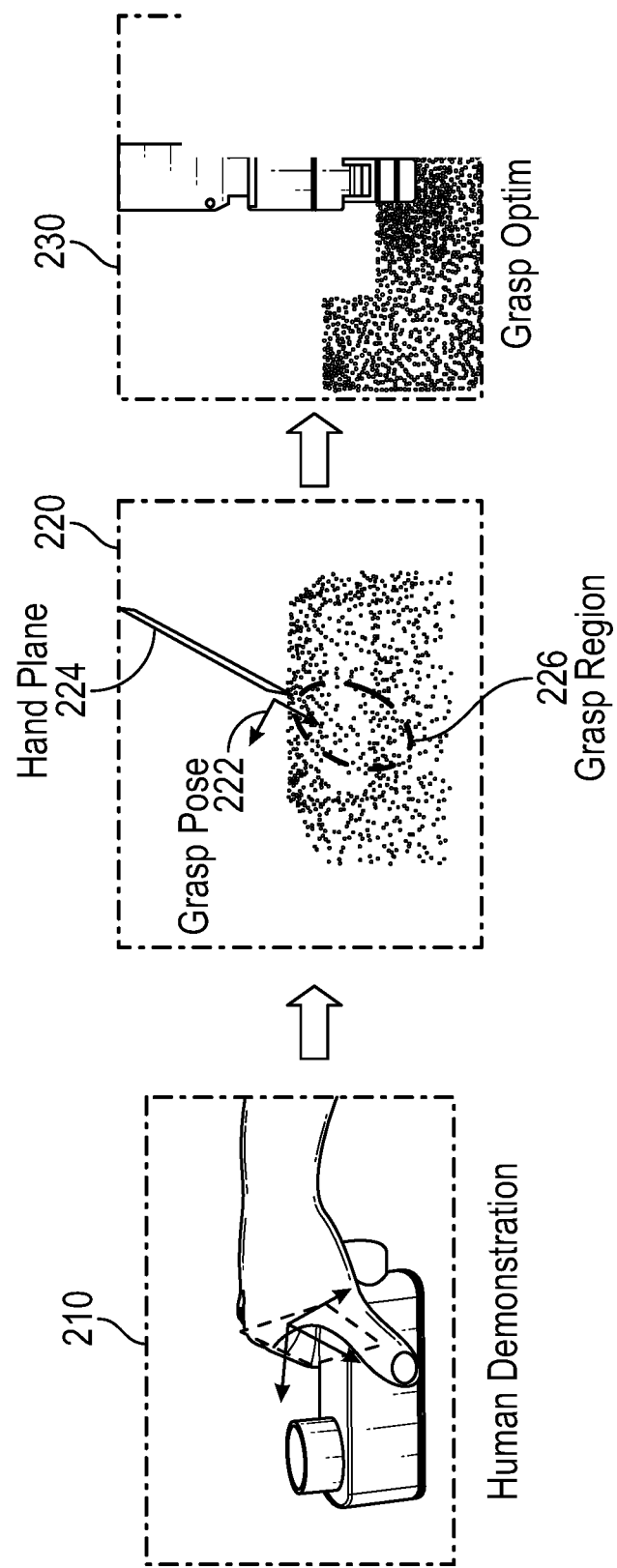
FIG. 2 is an illustration of the basic principles used in a technique for grasp teaching by human demonstration, according to an embodiment of the present disclosure.

FIG. 2 is an illustration of the basic principles used in a technique for grasp teaching by human demonstration, according to an embodiment of the present disclosure. In box 210, the human 180 (of FIG. 1) demonstrates a grasp on a workpiece, while images of the hand and the workpiece are captured. The three dimensional (3D) positions of the bones of the finger are detected in the camera images (this technique is discussed below), and a hand coordinate frame is computed based on the 3D finger positions. The position and orientation of the workpiece is also detected in the images or pre-defined in the demonstration workspace, so that the position and orientation of the hand coordinate frame relative to the workpiece are known. The hand coordinate frame is equated to a gripper coordinate frame, which in turn defines a grasp pose—that is, a six degree of freedom pose which includes three positions and three orientation angles of the gripper relative to the workpiece.

The grasp pose from the box 210 is used at box 220 in a step which determines a grasp region on the workpiece. The grasp pose is depicted in the box 220 as a coordinate frame triad at 222. A hand plane 224 is computed from the grasp pose 222. In the case of a parallel-finger gripper, the hand plane 224 is computed as the plane containing the two parallel fingers. Other gripper types may also be employed in the disclosed method—such as a vacuum (suction cup) gripper, where the hand plane would again be computed from the fingers of the human demonstration, and the human would demonstrate a grasp where the hand plane is substantially perpendicular to a flat surface of the workpiece. Detection of a hand pose and calculation of a corresponding gripper pose are discussed further below.

In the box 220, a point cloud model of the workpiece is used along with the hand plane 224 to compute a grasp region 226 on the workpiece. The grasp region 226 is determined by passing the hand plane 224 through the point cloud and selecting a set of points within a certain threshold distance of the hand plane 224. This is discussed in detail below. The resulting grasp region 226 represents a set of points on the surface of the workpiece in an area where the gripper should grasp the workpiece according to the human demonstration.

At box 230, a grasp optimization computation is performed using the grasp region 226 from the box 220 and the grasp pose determined from the demonstration at the box 210. The grasp optimization steps are also discussed below, including computing several optimized grasps from randomized starting configurations and selecting a best one of the grasps to add to a grasp database, where each grasp is stable with high quality surface contact.

The disclosed method for grasp teaching by human demonstration—depicted at a high level in FIG. 2—allow grasps to be demonstrated by a human in a simple and intuitive manner, while taking advantage of grasp optimization computation techniques which produce stable, high quality grasps. Details of each step of the disclosed method are discussed below in connection with the following figures.

Figure 3:
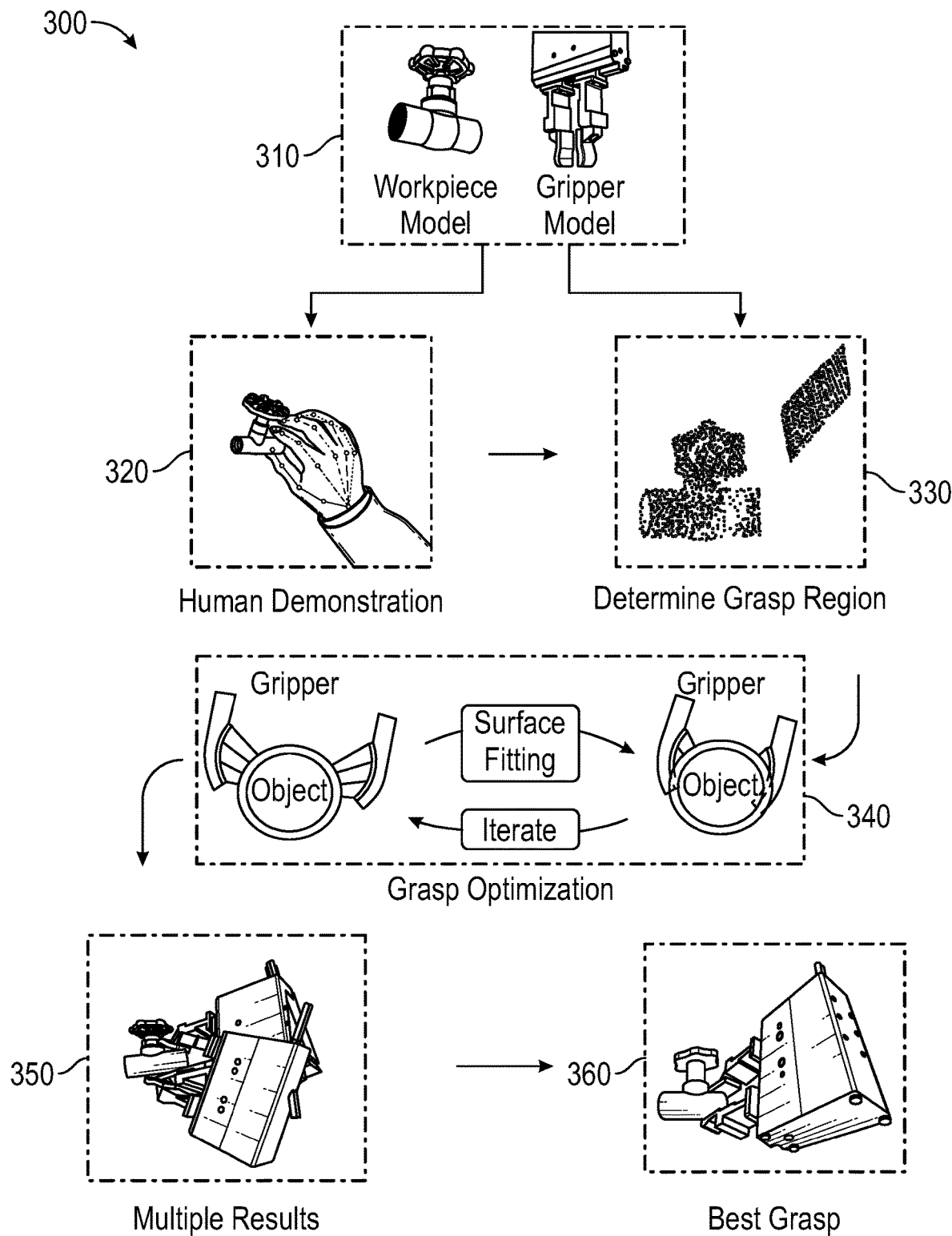
FIG. 3 is an illustrated flowchart diagram of steps included in a process used for grasp teaching by human demonstration, including grasp demonstration, grasp region determination, grasp optimization and selection of a best grasp, according to an embodiment of the present disclosure.

FIG. 3 is an illustrated flowchart diagram 300 of steps included in a process used for grasp teaching by human demonstration, including grasp demonstration, grasp region determination, grasp optimization and selection of a best grasp, according to an embodiment of the present disclosure. The flowchart diagram 300 of FIG. 3, along with the additional details depicted in FIGS. 4-7, provides a complete explanation of the disclosed technique for grasp teaching by human demonstration which was outlined above in FIG. 2.

At box 310, models of the workpiece and the gripper are provided. The workpiece model is a 3D surface or solid model of the part which is to be picked from the bin 110 by the robot 100 (of FIG. 1). The workpiece model is typically created in a computer aided design (CAD) system. The workpiece model shown in the box 310 depicts a pipe valve which is used as an example of the part throughout most of the remainder of the present disclosure.

The gripper model includes surface or solid shape data for gripper fingers of a gripper. The gripper model in FIG. 3 illustrates a two-finger parallel gripper, however, other types of gripper designs may be used. The gripper fingers typically include finger tips typically having a concave inner (gripping) surface shape which is selected to correspond with the part (e.g., the pipe valve) which is being grasped by the robot. That is, the finger tips can produce a stable grasp on many different parts of the pipe valve—such as the handle, the coupling body, the valve stem collar, etc. Different grippers having different designs of the finger tips may be employed based on the shape of the part being grasped, including a gripper which grips an inside surface of a workpiece which is shown in a later figure. The shape of the finger tips (i.e., the contact surfaces) is used in the grasp quality optimization computations discussed below.

The gripper model also includes gripper actuation parameters—such as geometric definition of an actuator having an axis along which the fingers translate to provide a finger grasp width, which is the distance that the fingers are separated by the gripper actuator. The grasp width may be commanded by the controller 150 (FIG. 1) to increase before part grasping and to decrease to grasp the part. The mounting orientation of the gripper actuator on the wrist of the robot 100 is known, and the wrist rotation angle is known, which means that the translational axis of the fingers relative to the robot wrist is known, which in turn enables the locations of the finger tips in space to be computed based on the grasp width.

At box 320, the human demonstration is performed and captured in images, as described above with respect to the box 210 of FIG. 2. The human demonstration of a grasping operation at the box 320 is performed in a workcell with a camera connected to a computer—such as the camera 170 connected to the computer 160 as shown in FIG. 1. The workpiece model from the box 310 is provided to the computer so that the pose of the hand relative to the pose of the workpiece can be captured in images at the box 320.

Techniques for detecting a position of a hand in images and computing a hand coordinate frame and a corresponding gripper coordinate frame were disclosed in U.S. patent application Ser. No. 16/843,185, titled ROBOT TEACHING BY HUMAN DEMONSTRATION, filed Apr. 8, 2020 and commonly assigned with the present application, and herein incorporated by reference in its entirety. The aforementioned application is hereinafter referred to as "the '185 application".

Figure 4:
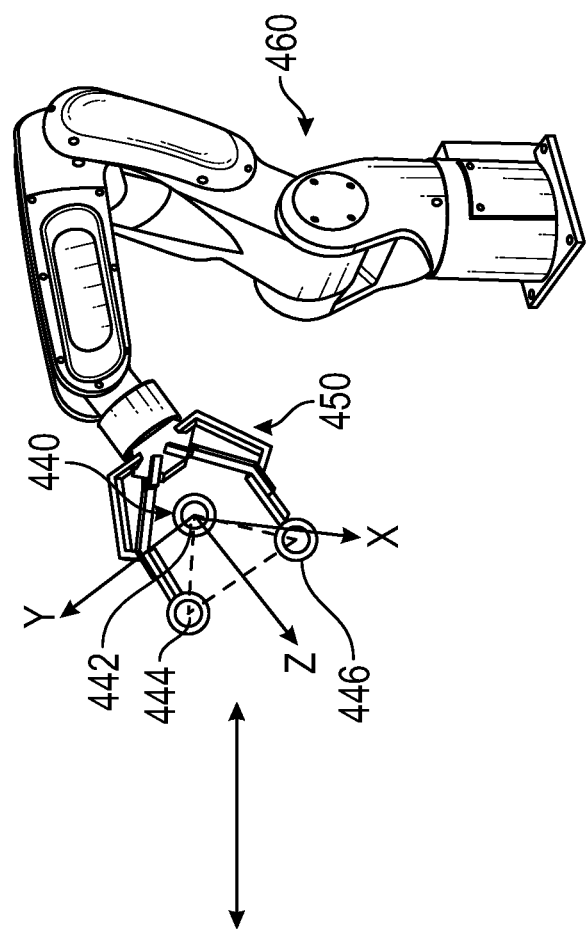
FIG. 4 is an illustration of a technique for analyzing images of a human hand to determine a corresponding position and orientation of a finger-type robotic gripper, according to an embodiment of the present disclosure.
Figure 4:
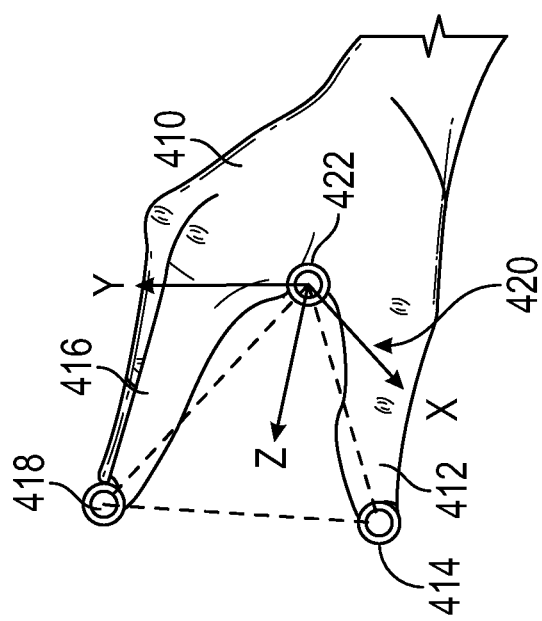

FIG. 4 is an illustration of a technique for analyzing images of a human hand to determine a corresponding position and orientation of a finger-type robotic gripper, according to an embodiment of the present disclosure. The techniques depicted in FIG. 4, along with a similar technique for computing a coordinate frame for a vacuum gripper, and details of steps for identifying 3D coordinates of key points on the demonstrator's hand, were disclosed in the '185 application.

A hand 410 has a hand coordinate frame 420 defined as being attached thereto, where the spatial position and orientation of the hand coordinate frame 420 are computed from images of the hand as discussed here and in the '185 application. The hand 410 includes a thumb 412 with a thumb tip 414, and a forefinger 416 with a forefinger tip 418. Other points on the thumb 412 and the forefinger 416 may also be identified in the camera images, such as the locations of the base of the thumb 412 and the forefinger 416 and the first knuckle of the thumb 412 and the forefinger 416, etc.

A point 422 is located midway between the base of the thumb 412 and the base of the forefinger 416, where the point 422 is defined as the origin of the hand coordinate frame 420. The orientation of the hand coordinate frame 420 may be defined using any convention which is suitable for correlation to the robotic gripper orientation. For example, the Y axis of the hand coordinate frame 420 may be defined as being normal to the plane of the thumb 412 and the forefinger 416 (that plane being defined by the points 414, 418 and 422). Accordingly, the X and Z axes lie in the plane of the thumb 412 and the forefinger 416. Further, the Z axis may be defined as bisecting the angle made by the thumb 412 and the forefinger 416 (the angle 414-422-418). The X axis orientation may then be found by the right hand rule from the known Y and Z axes. As mentioned above, the conventions defined here are merely exemplary, and other coordinate frame orientations may be used instead. The point is that a coordinate frame position and orientation may be defined based on key recognizable points on the hand, and that coordinate frame position and orientation can be correlated to a robotic gripper position and orientation.

A camera (the camera 170 in FIG. 1) is used to provide the images of the hand 410, where the images can then be analyzed to determine the spatial positions (such as in a work cell coordinate frame) of the thumb 412 and the forefinger 416, including the thumb tip 414 and the forefinger tip 418 along with the knuckles, and therefore the origin location 422 and orientation of the hand coordinate frame 420. In FIG. 4, the location and orientation of the hand coordinate frame 420 are correlated to a gripper coordinate frame 440 of a gripper 450 attached to a robot 460. The gripper coordinate frame 440 has an origin 442 which corresponds to the origin 422 of the hand coordinate frame 420, and points 444 and 446 which correspond to the forefinger tip 418 and the thumb tip 414, respectively. Thus, the two fingers of the finger-type gripper 450 are in the X-Z plane of the gripper coordinate frame 440, with the Z axis bisecting the angle 446-442-444.

The origin 442 of the gripper coordinate frame 440 is also defined as the tool center point of the robot 460. The tool center point is a point whose location and orientation are known to the robot controller, where the controller can provide command signals to the robot 460 to move the tool center point and its associated coordinate frame (the gripper coordinate frame 440) to a defined location and orientation. The robot 460 and the gripper 450 of FIG. 4 correspond with the robot 100 and the gripper 120 of FIG. 1. Thus, when a grasp from the grasp database is selected by the robot controller 150 during real-time robot operations, the controller knows how to position the robot 100 so that the gripper 120 is positioned and oriented properly according to the chosen grasp. The grasps in the database are taught by human demonstration as disclosed herein, including analyzing positions of the demonstrator's hand as shown in FIG. 4.

It is emphasized that in the currently disclosed technique, the hand coordinate frame determined as shown in FIG. 4 is not used to directly compute a grasp. Returning to FIG. 3—the hand coordinate frame computed from the demonstration images at the box 320 is provided to box 330 where a grasp region on the workpiece will be computed. The workpiece model and the gripper model from the box 310 are also provided to the box 330. The grasp region computed at the box 330 is not a final grasp to be added to a grasp database. Rather, the grasp region computed at the box 330 is essentially a target region on the surface of the workpiece which will be used in a later grasp optimization computation, which ultimately leads to a grasp to add to the database. This is all discussed below.

Figure 5:
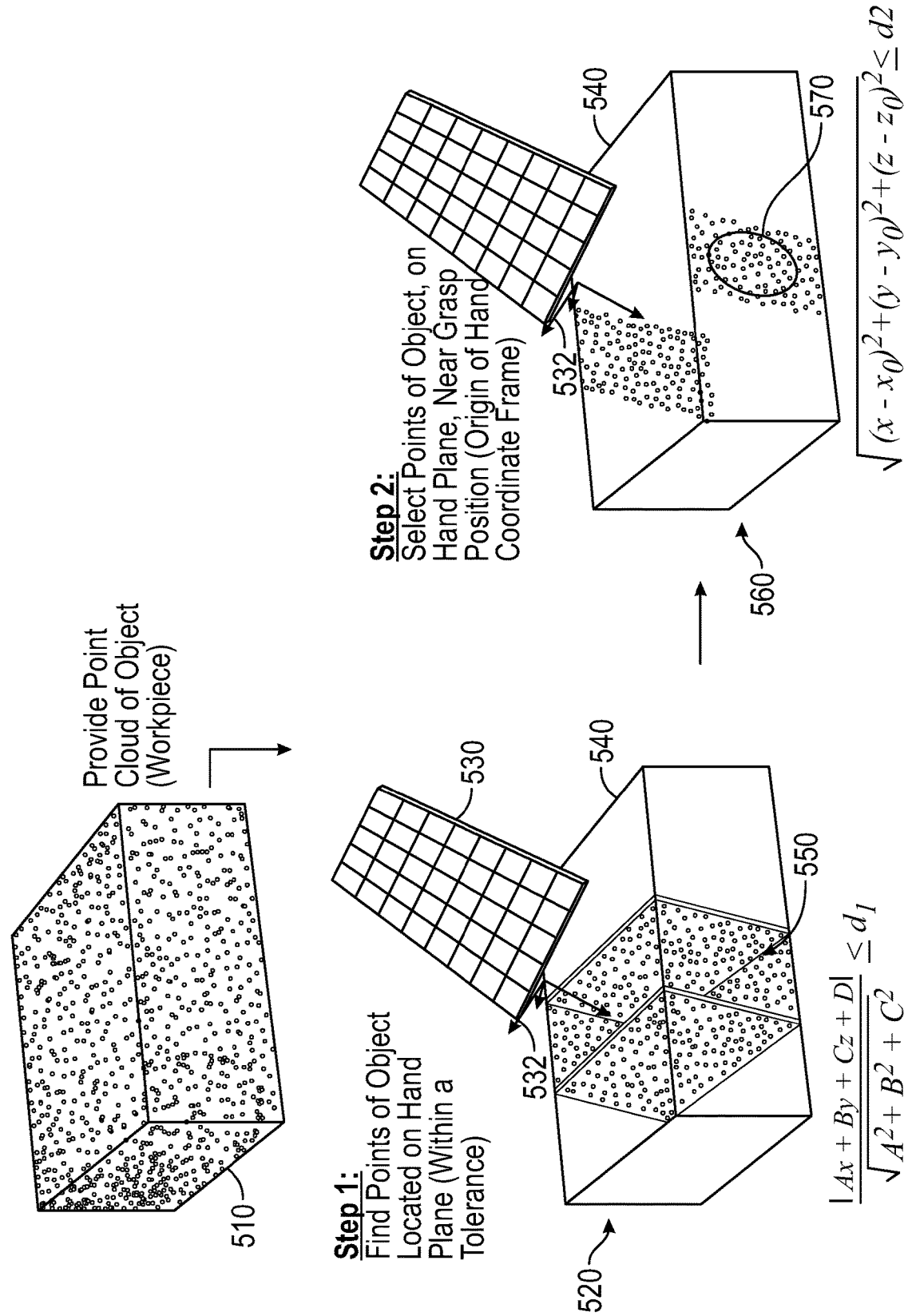
FIG. 5 is an illustration of a technique for identifying a grasp region on a workpiece based on a hand pose determined from camera images of a grasp demonstration, according to an embodiment of the present disclosure.

FIG. 5 is an illustration of a technique for identifying a grasp region on a workpiece based on a hand pose determined from camera images of a grasp demonstration, according to an embodiment of the present disclosure. FIG. 5 details the steps used for determining a grasp region in the box 330 of FIG. 3.

The grasp region identification begins by providing a point cloud 510 representing the workpiece. The point cloud 510 can be determined from the workpiece model at the box 310. The object shown in FIG. 5 is a simple hexahedron, which is used for the sake of illustration clarity. It is to be understood that in actual computations, the point cloud 510 represents the 3D shape of the workpiece for which a grasp is being computed (such as the pipe valve).

With the point cloud 510 provided, the first step (shown at 520) is to find points of the object located within a certain distance of a hand plane 530. The hand plane 530 is a plane defining a pose of the hand during human demonstration of the grasp, as discussed with respect to FIG. 2, box 220. For example, the hand plane 530 would be the plane containing the thumb and forefinger for a two-finger type gripper. The origin of the hand coordinate frame is shown by a triad 532. The hand plane 530 is passed through the point cloud 510 of object 540 (shown in outline form), and all points (x,y,z) within a tolerance distance $d_1$ of the hand plane 530 are selected.

The equation used for the first point selection step is:

$$\frac{|Ax + By + Cz + D|}{\sqrt{A^2 + B^2 + C^2}} \leq d_1 \quad (1)$$

Where the constants A, B, C and D are determined from the equation of the hand plane 530 (Ax+By+Cz+D=0), each point (of the point cloud 510) being evaluated has coordinates (x,y,z), and $d_1$ is the tolerance distance.

The results of the first point selection step are shown in the illustration at 520, where a section 550 is the volume containing points from the point cloud 510 which are within the tolerance distance $d_1$ of the hand plane 530.

A second point selection step (shown at 560) involves selecting only the points from the section 550 which are on the surface of the object 540 and are within a second tolerance distance $d_2$ of the origin of the hand coordinate frame 532. This second point selection step provides object surface points which will be used for grasp optimization.

The equation used for the second point selection step is:

$$\sqrt{(x-x_0)^2+(y-y_0)^2+(z-z_0)^2} \leq d_2 \quad (2)$$

Where each point (from the section 550 of the point cloud 510) being evaluated has coordinates (x,y,z), the hand coordinate frame 532 has origin coordinates $(x_0,y_0,z_0)$, and $d_2$ is the second tolerance distance.

The results of the second point selection step are shown in the illustration at 560, where only points from the section 550 on the side surfaces of the object 540 are retained in the illustration. The points shown at 560 may be further downselected to more localized grasp regions as indicated by ellipse 570, such as by selecting only points on the surface of the object 540 which are within a tolerance distance of the thumb tip point 414 (represented by the ellipse 570) and the fingertip point 418 (represented by an ellipse on the back side of the section 550, not shown).

FIG. 5 illustrates one technique for selecting points on the surface of the object 540 which define a grasp region to be used in grasp optimization. Other technique may be used as deemed suitable. The objective is to identify grasp region points on the object 540 (workpiece) which correspond with the human demonstration of the grasp, and then use the grasp region points in an optimization computation.

Returning to FIG. 3—the grasp region computed at the box 330 (detailed in FIG. 5) is provided to box 340 where a grasp optimization computation is performed. In addition to the grasp region on the workpiece, the grasp optimization computation at the box 340 also uses the gripper pose relative to the workpiece (where the gripper coordinate frame is determined from the hand coordinate frame as discussed above with respect to FIG. 4).

Techniques for performing grasp optimization using a workpiece point cloud model and a gripper having an initial position and orientation were disclosed in U.S. patent application Ser. No. 17/651,485, titled REGION-BASED GRASP GENERATION, filed Feb. 17, 2022 and commonly assigned with the present application, and herein incorporated by reference in its entirety. The aforementioned application is hereinafter referred to as "the '485 application".

Figure 6:
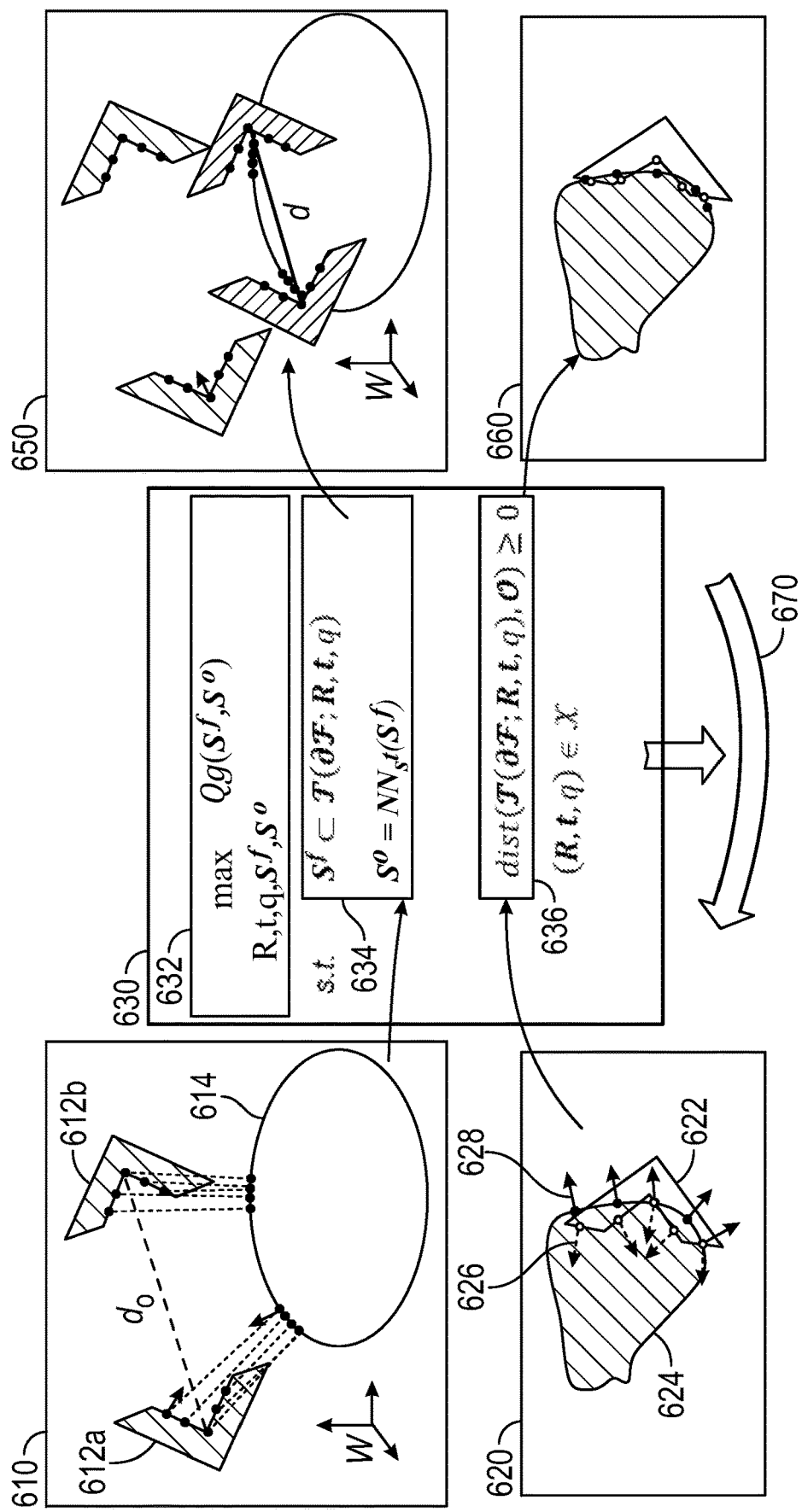
FIG. 6 is an illustration of the grasp optimization computation employed in the grasp optimization box of FIG. 3, including surface fitting, collision avoidance and the use of the identified grasp region on the part, according to an embodiment of the present disclosure.

FIG. 6 is an illustration of the grasp optimization computation employed in the grasp optimization box 340 of FIG. 3, including surface fitting, collision avoidance and the use of the identified grasp region on the part, according to an embodiment of the present disclosure. The techniques depicted in FIG. 6 were disclosed in the '485 application.

At box 610, a configuration of gripper parts 612a and 612b relative to an object 614 is defined, gripper surface points $p_i$ are defined, and corresponding nearest neighbor points on the object 614 are defined. The 3D poses of the gripper parts 612a and 612b are determined from the gripper model (from the box 310) and gripper coordinate frame from the human demonstration (from the box 320). The nearest neighbor points on the object 614 are selected from the grasp region defined in the box 330. All positions and orientations in the optimization computation of FIG. 6 may be defined in a world coordinate frame W depicted in the box 610.

The scene in the box 610 depicts an initial configuration of the gripper with respect to the grasp region of the object, where the initial pose of the gripper with respect to the object is defined randomly relative to the nominal gripper pose (from the hand coordinate frame 532) within some range of translational distances, rotational angles and gripper opening widths. In other words, the initial position and orientation of the gripper fingers is defined within some predefined sampling space around the points in the grasp region of the object 614. The random initial gripper pose ensures that each optimization computation converges to a slightly different grasp.

Throughout the discussion of the optimization computation, the gripper (finger) surfaces as defined by the points $p_i$ are referred to as $S^f$, while the object surface (all sampling points within the grasp region on the object, and the nearest neighbor points specifically) is referred to as $S^o$. The target grasp region on the object is referred to as $S^t$.

Box 620 contains a general illustration of how collisions between one of the gripper finger surfaces $S^f$ and the object surface $S^o$ are identified. In one embodiment, a general mesh of points $p_i$ is applied to the gripper finger surface $S^f$— including inner surfaces of the gripper fingers 612 (the portion of the gripper most commonly used for grasping an object), and also outer surfaces and side surfaces of the gripper fingers if identified by the user on the gripper model. For visual clarity, the illustration in the box 620 includes contact points only on the inner surfaces of the finger 612, and FIG. 6 includes 2D illustrations of the gripper and object, collisions and contacts. It is to be understood that the gripper and part models, point coordinates and transformations are all three dimensional in nature in the actual optimization computations of the present disclosure.

In the box 620, a gripper part 622 and an object 624 are shown. The object 624 may of course have any general shape, as illustrated. For interference check purposes, the object 624 represents the entire part (e.g., the point cloud 510), not just the grasp region which was previously computed. Because the part/object and the gripper were defined by the 3D models 310 and 320 discussed earlier, each of the points on the gripper finger surface $S^f$ and the object surface $S^o$ has a local surface normal, as shown by vectors 626 and 628, respectively. The local surface normal vectors are used in the one embodiment of the collision avoidance calculations, where the vectors are used to calculate an amount of penetration of the gripper into the object, and vice versa, where this penetration or interference is penalized in a constraint function. The local surface normal vectors are also used in grasp quality calculations, as normal forces are present even in the absence of friction, whereas tangential forces are a function of friction coefficient.

In another, preferred embodiment of collision avoidance or interference check calculations, a signed distance field method is used. In the signed distance field method, the entirety of the gripper part 622 is modeled as a 3D grid of cells or voxels. The signed distance field grid also extends to some volume of space surrounding the gripper. For example, each of the gripper fingers 612 could be contained in a brick-shaped hexahedron of signed distance field cells. The signed distance field cells which are on the surface of the gripper have a distance value d of zero. Signed distance field cells which are inside the gripper have a negative value of d denoting how many cells distant they are from the surface, while cells which are outside the gripper have a positive value of d denoting how many cells distant they are from the gripper surface. These signed distance field modeling conventions are known in the art.

The object 624 is modeled by the sampling points discussed above. Using the signed distance field method, at each iteration (pose of the gripper with respect to the object), each sampling point on the object 624 is checked to determine which cell of the gripper signed distance field it occupies, if any. This calculation can be performed very quickly for all of the sampling points on the object 624, leading to a determination of which points on the object 624 interfere with the gripper 622, and what the amount of gripper-object penetration is. The amount of interference or penetration is determined based on the negative value of d for cells inside the gripper which contain one or more sampling point on the object 624. In this way, the signed distance field method provides interference check results which can be used in the overall optimization model of FIG. 6.

The illustration in the box 620 does not show a signed distance field grid model of the gripper 622. However, the illustration in the box 620 should be considered to be generally representative of the collision avoidance or interference check portion optimization computation used in the presently disclosed grasp generation method, whether the surface point (first) embodiment is used, or the signed distance field (second) embodiment is used.

In box 630, the grasp searching problem is modeled as an optimization, and one iteration is computed. To compute stable grasps, surface contact area is maximized in the optimization. Gripper-object collision is also penalized in the optimization to avoid penetration, as described above. The entire object is considered for collision avoidance with the gripper, while the grasping contact is defined in terms of only those points on the object belonging to the grasp region, not the entire part. The optimization formulation shown in the box 630 is duplicated below as Equations (3a)-(3e), and is discussed in the following paragraphs.

$$\max_{R,t,q,S^f,S^o} Q_g(S^f, S^o) \quad (3a)$$

s.t. $S^f \subset \mathcal{T}(\partial \mathcal{F}; R, t, q)$ (3b)

$S^o = NN_{S^f}(S^f)$ (3c)

$dist(\mathcal{T}(\partial \mathcal{F}; R, t, q), O) \geq 0$ (3d)

$(R, t, q) \in \mathcal{X}$ (3e)

The optimization formulation includes an objective function (Eq. 3a) in box 632 which is defined to maximize grasp quality $Q_g$, where the grasp quality $Q_g$ is a function of the contact surfaces $S^f$ and $S^o$. The grasp quality $Q_g$ may be defined in any suitable manner. In a representative embodiment, the grasp quality $Q_g$ is the negative of the total distance between the points $p_i$ on the gripper finger surface $S^f$ and the matched nearest neighbor points NN on the object surface $S^o$. That is, $Q_g = -\Sigma p_i \|p_i - NN\|$, where a smaller total sum of the distances results in a larger grasp quality $Q_g$, which means a better surface fit between the gripper and the object. In other words, a good quality grasp has a small negative value of $Q_g$, and a poor quality grasp has a large negative value of $Q_g$. In practical terms, a good quality grasp is stable, where any minor movement of the object in the gripper is quickly stopped by friction and/or normal forces and does not lead to a loss of grip.

The optimization formulation of Equations (3a)-(3e) includes constraint functions in box 634. A constraint function (Eq. 3b) defines the gripper finger surface $S^f$ in terms of the transformations (R,t,q). A constraint function (Eq. 3c) defines the object surface $S^o$ in terms of the nearest neighbor points NN within the target grasp region (S t) in relation to the gripper finger surface S. The constraint functions in the box 634 (Equations 3b and 3c), along with the objective function in box 632, collectively lead to better surface fitting of the gripper (finger) surface $S^f$ to the object surface $S^o$, including moving the points $p_i$ on the gripper toward their nearest neighbors in the target grasp region on the object. This is shown in box 650. That is, the transformations determined from the constraint functions in the box 634 cause the gripper fingers to move toward an improved surface fitting condition within the target grasp region.

A constraint function (Eq. 3d) in box 636 dictates that the transformed gripper finger surface (T($\partial \mathcal{F}$ ; R, t, q)) should not penetrate the object O; that is, the distance should be greater than or equal to zero. As mentioned above, the gripper-object collision or penetration can be computed with the signed distance field method, or with a point/surface model. This constraint in the box 636 leads to improved collision avoidance in the next iteration, as shown in box 660. Finally, Equation (3e) indicates that the transformations T (R,t,q) are elements of the feasible set $\mathcal{X}$ of transformations (in one embodiment, R may have any rotational value, t must be within a bounding box size of the object, and q is limited by the grasp range defined in the gripper model from the box 310).

The constraint functions of Equations (3b)-(3d) described above (in the boxes 634 and 636 of FIG. 4) are considered by penalty methods, where the constraint violations are treated as a cost function in the grasp quality calculation. That is, the greater the constraint violations, the larger the cost function, and the smaller the grasp quality. By placing constraints into costs against grasp quality, the optimization formulation shown in the box 630 can be solved by least squares.

A one-step least square linear algebra computation is performed on the optimization equations in the box 630 to identify the transformations T (R,t,q) which move the gripper fingers in a direction of improved grasp quality on the target grasp region while satisfying the constraint functions. Arrow 670 shows that, after calculation of the transformations T, the grasp optimization method returns to the box 610 (where the position of the transformed gripper parts relative to the object is determined, and nearest neighbor points on the object corresponding to the gripper surface points $p_i$ are defined) and the box 620 (collisions identified). This process is repeated until the grasp position converges to a local maximum grasp quality.

After convergence to a quality grasp, the process is started over again with a new random initial configuration for the same target grasp region, and this is repeated until a user-defined number of grasps (e.g., 20) for the current target grasp region (defined by the human demonstration) is reached. Each random initial configuration may include gripper-object interference, or it may not. The initial configuration of the gripper parts with respect to the object, shown in the box 610 of FIG. 6, is varied randomly for each new grasp computation cycle, so that a diverse set of grasps on the target grasp region is obtained. All of the quality grasps computed in this way are stored in a temporary grasp array for further processing, as will be discussed below with respect to box 350 of FIG. 3.

The optimization computation shown in FIG. 6 and described above is one example of a grasp optimization technique. Other grasp optimization or computation formulations may be employed as appropriate, as long as a target grasp regions can be defined as geometric regions of a part where the gripper fingers are to make contact.

Returning to FIG. 3—the grasp optimization technique described above with respect to FIG. 6 is performed in the box 340 of FIG. 3. As discussed above, the optimization computation can be performed multiple times with initial configurations which are randomly varied relative to the nominal gripper pose determined from the hand pose in the human demonstration. The multiple stable grasps computed at the box 340 are shown in the box 350. Each of these grasps is based on the grasp region determined at the box 330 from the human demonstration. Because of the randomly varied initial configuration for the optimization computation, each of the grasps in the box 350 will have a slightly different gripper position and orientation relative to the workpiece.

Figure 7:
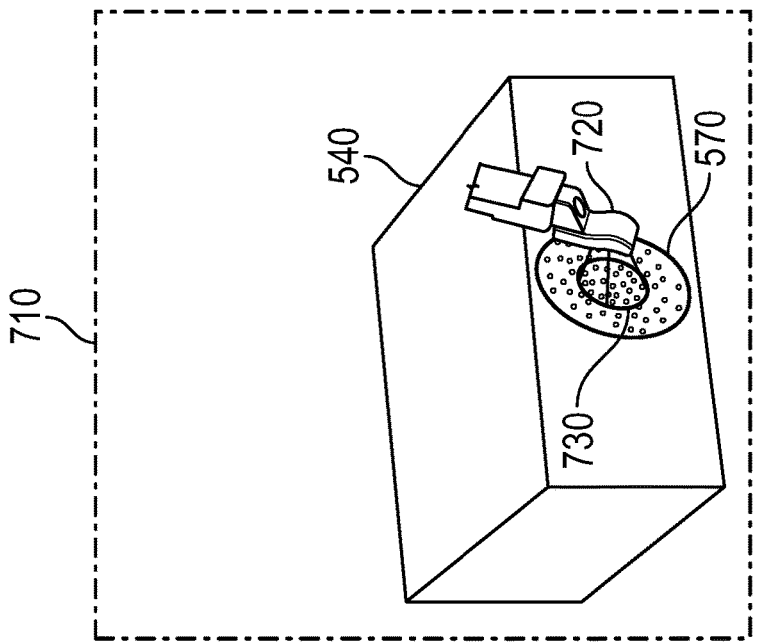
FIG. 7 is an illustration of a technique used to identify a best grasp from the multiple grasp results produced by the grasp optimization as shown in FIG. 3, according to an embodiment of the present disclosure.

FIG. 7 is an illustration of a technique used to identify a best grasp from the multiple grasp results produced by the grasp optimization as shown in the boxes 340 and 350, according to an embodiment of the present disclosure. The best grasp is defined as the one most like the human demonstration, as determined based on three parameters.

The first parameter is the difference in position (x,y,z coordinates) between the computed grasp and the human demonstration. Recall that the analysis of the images from the human demonstration resulted in a hand coordinate frame and a corresponding gripper coordinate frame. The grasps produced by the optimization computation (box 340 and FIG. 6) are slightly different from the demonstrated gripper coordinate frame, both because of the randomized initialization and because the computed grasps have been optimized for gripper-object surface contact. For each of the computed grasps (from the box 350), the first parameter in the cost function is the difference in position (e.g., square root of sum of squares of differences in x, y, z coordinates) between the coordinate frame origin of the computed grasp and the origin of the gripper coordinate frame from human demonstration.

The second parameter in the cost function is the difference in rotational orientation (yaw, pitch and roll, or w, p, r angles) between the computed grasp and the human demonstration. This parameter is computed much like the first parameter in the cost function. That is, for each of the computed grasps (from the box 350), the second parameter is the difference in rotation (e.g., square root of sum of squares of differences in w, p, r angles) between the coordinate frame of the computed grasp and the gripper coordinate frame from human demonstration.

The third parameter in the cost function is the inverse of an overlapping area S area between the grasp region on the workpiece and the gripper surface. This is illustrated in box 710. The overlapping area S area is determined by identifying all points in the grasp region (from human demonstration) which are within a threshold distance of a point on the gripper surface (for the particular grasp being evaluated). The grasp region is indicated by the ellipse 570 (from FIG. 5) in the box 710. The corresponding gripper finger is shown with reference number 720. The overlapping area S area is then found by circumscribing the identified points within the distance threshold. The overlapping area S area is shown as a smaller ellipse 730. This overlapping area S area serves as a measurement of the amount of contact between the gripper fingers (for a particular grasp from the box 350) and the grasp region (which was determined from human demonstration). The inverse of the overlapping area is used in the cost function, because a higher overlapping area is better.

Using the three parameters described above, an example of a cost function for the selection of a best one of the grasps is as follows:

$$f = w_1 \cdot \text{diff}_{dist}(x, y, z) + w_2 \cdot \text{diff}_{angle}(w, p, r) + w_3 \cdot \frac{1}{S_{area}} \qquad (4)$$

Where $\text{diff}_{dist}(x,y,z)$ is the difference in position between the computed grasp and the human demonstration, $\text{diff}_{angle}(w, p, r)$ is the difference in rotational orientation between the computed grasp and the human demonstration, S area is the overlapping area between the grasp region on the workpiece and the gripper surface, and $w_1$-$w_3$ are weighting factors. The grasp with the minimum value of the cost function of Equation 4 is selected as the best grasp at box 360 of FIG. 3, and is added to a grasp database.

In the technique of the present disclosure, only one grasp (the best grasp identified as explained above) is added to the grasp database for each instance of human demonstration. In order to build a grasp database with many different grasps (on different locations of the workpiece, and from different gripper orientation angles), the human demonstration can be performed as many times as needed to teach each of the desired grasps individually.

The computations performed in all of the steps shown in FIG. 3, including the details described in FIGS. 4-7, may be performed on the computer 160 of FIG. 1, or any other suitable computer—including the robot controller 150 in some embodiments.

Figure 8:
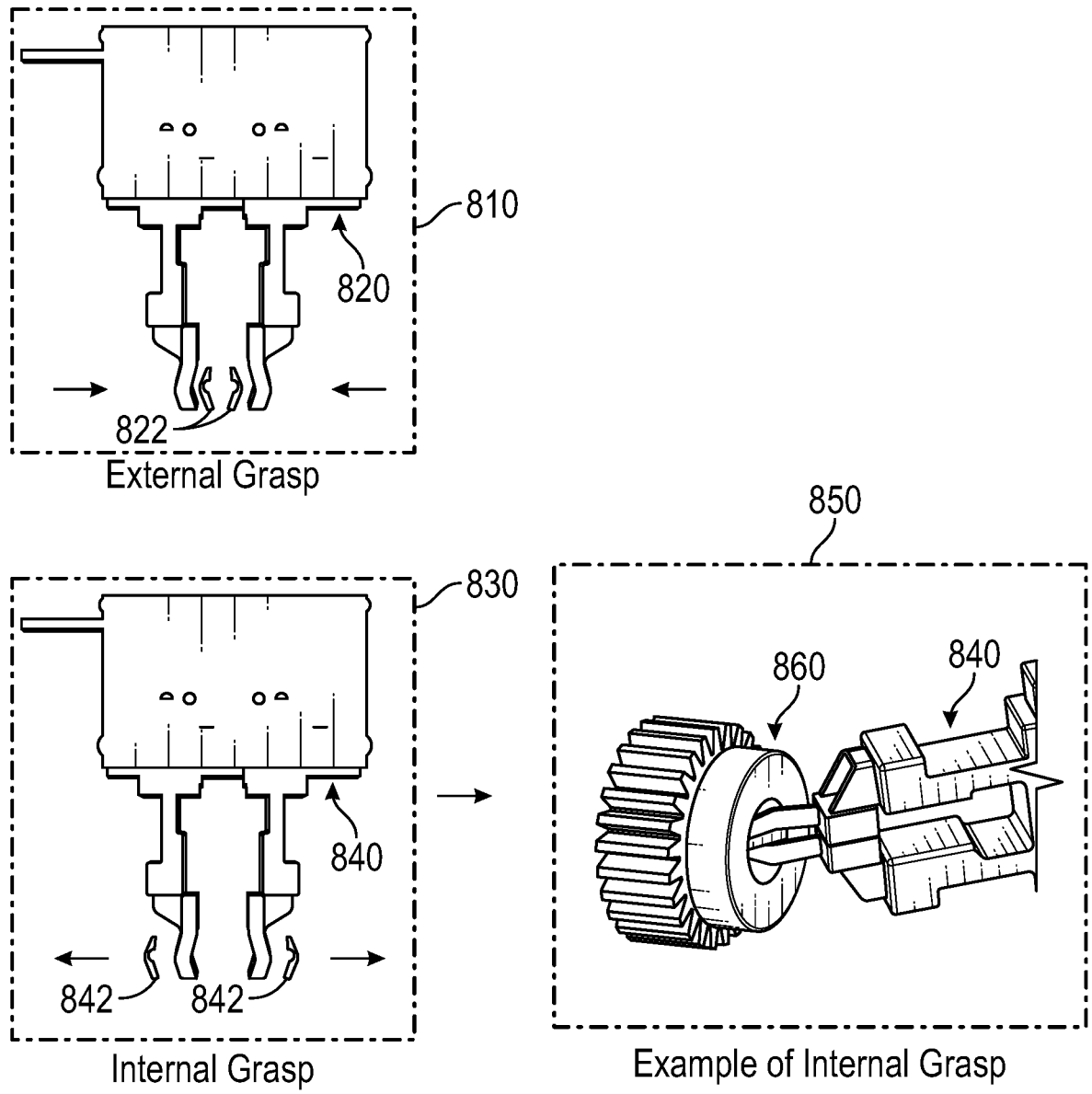
FIG. 8 is an illustration of a finger-type gripper performing both external and internal grasps, as may be used in the process for grasp teaching by human demonstration, according to embodiments of the present disclosure.

FIG. 8 is an illustration of a finger-type gripper performing both external and internal grasps, as may be used in the process for grasp teaching by human demonstration, according to embodiments of the present disclosure. In box 810, a gripper 820 is configured to perform an external grasp—that is, the fingers of the gripper 820 grasp an external surface of a workpiece. Gripper surfaces are defined on inner faces of the gripper fingers, as illustrated at 822. This is a traditional grasping configuration, and is representative of the examples discussed and illustrated above.

In box 830, a gripper 840 is configured to perform an internal grasp—that is, the fingers of the gripper 840 grasp an internal surface of a workpiece. Gripper surfaces are defined on outer faces of the gripper fingers, as illustrated at 842. An example of an internal grasp is illustrated in box 850, where the gripper 840 is grasping a workpiece 860 (a gear) by spreading the gripper fingers inside a hole or aperture in the gear.

Both internal and external grasp types are supported in the presently disclosed techniques for grasp teaching by human demonstration, where the type of grasp (internal or external) may be defined as a configuration setting, and may also be incorporated in the gripper model provided in the box 310. An internal grasp can be demonstrated by the human in a simple, intuitive manner—by placing the tips of the thumb and forefinger into the opening in the workpiece and spreading the thumb and forefinger apart to grasp the workpiece.

Figure 9:
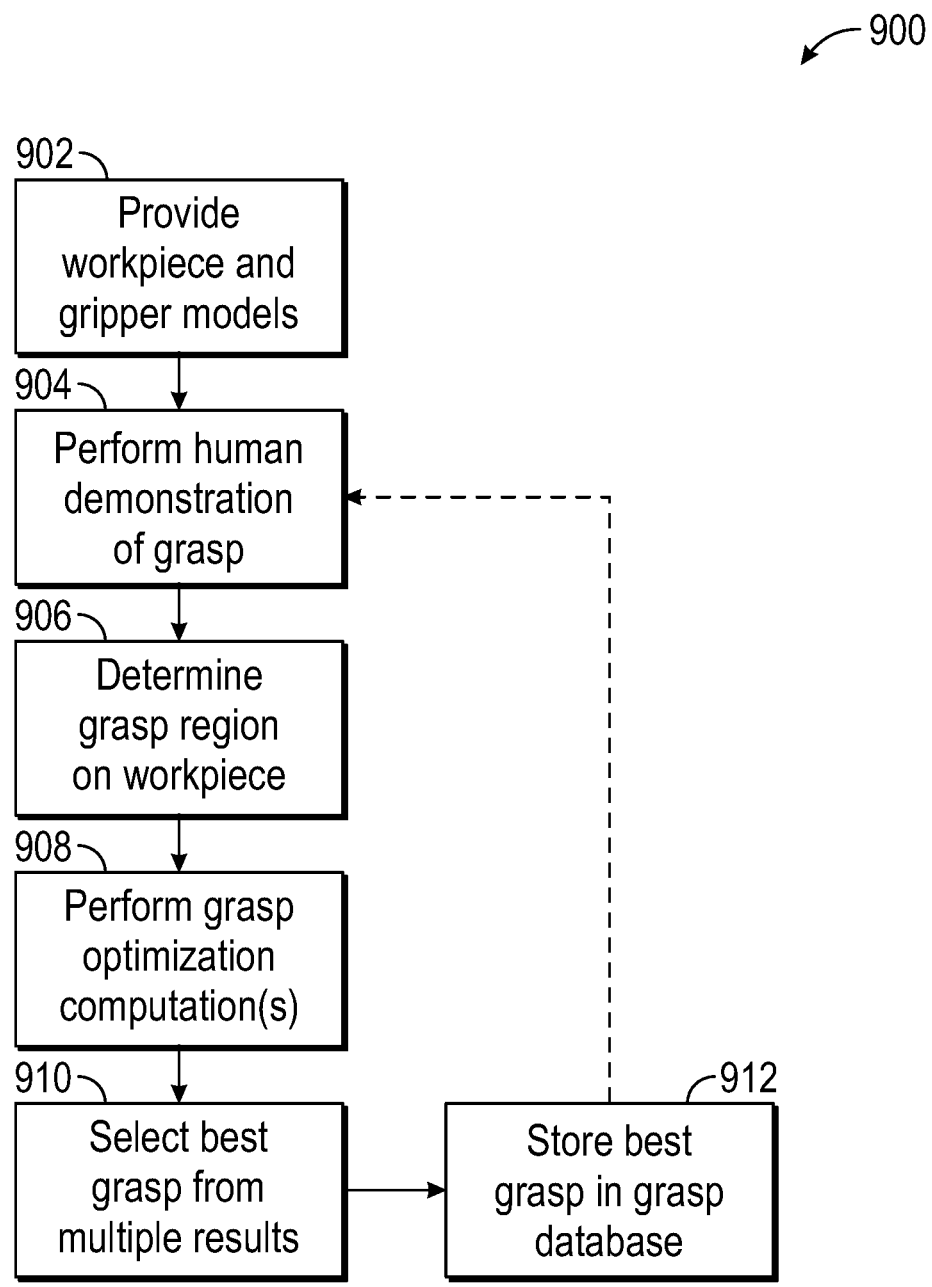
FIG. 9 is a flowchart diagram of a method for robotic grasp teaching by human demonstration, according to an embodiment of the present disclosure.

FIG. 9 is a flowchart diagram 900 of a method for robotic grasp teaching by human demonstration, according to an embodiment of the present disclosure. At box 902, models of the workpiece and the gripper are provided to/on a computer which runs the grasp teaching method algorithm. The computer which runs the grasp teaching method algorithm may be the computer 160 of FIG. 1, or the robot controller 150. The workpiece model is a 3D model of the part for which grasps are to be taught, and the gripper model includes both 3D geometry of the gripper and actuation parameters (e.g., two-finger parallel gripper with finger position defined by a grasp width).

At box 904, the human demonstration of the grasp is performed and images of the demonstration are captured by a camera and provided to the computer running the algorithm. The technique for analyzing the images to determine a hand plane and a gripper coordinate frame was discussed in relation to FIG. 4. The human demonstration indicates a grasp pose and a grasp region on the workpiece in a simple and intuitive manner for the demonstrator, and the grasp pose and region are then used in further calculations to compute a stable, high quality grasp corresponding to the demonstration.

At box 906, the grasp region on the workpiece is determined from the hand plane and the origin of the hand coordinate frame as described earlier with respect to FIG. 5. The grasp region is an area on the surface (or on opposing surfaces for a two-finger gripper) of the workpiece which corresponds with the finger/thumb contact points as computed from the hand plane. At box 908, a grasp optimization computation is performed using the grasp region on the workpiece and the hand coordinate frame. The grasp optimization computation—which was described in detail with respect to FIG. 6—may be performed multiple times with randomized initial configurations in order to provide several slightly different grasps corresponding to the single human demonstration.

At box 910, the best grasp is selected from the multiple optimization results. As discussed earlier in relation to FIG. 7, the best grasp is the one determined to be the most like the one demonstrated by the human based on a cost function calculation. In one embodiment, the cost function evaluates three parameters—a position difference (between each computed grasp and the hand coordinate frame from demonstration), a grasp rotation difference, and an overlap area between the computed gripper surfaces and the grasp region.

At box 912, the best grasp from the box 910 is stored in a grasp database for later used by a robot in real-time part grasping operations. The human demonstration from the box 904 ultimately provides a single robust, high quality grasp. In order to populate the grasp database with a diverse set of grasps (on different parts of the workpiece, and at different gripper orientations), the human demonstration can be repeated as many times as necessary, as indicated by the arrow from the box 912 returning to the box 904.

The grasp teaching from human demonstration technique discussed above offers several advantages over existing methods. The disclosed methods provide high quality, full-DOF grasps with surface contacts; thus the generated grasps are robust to uncertainties and disturbances. The grasp generation method is easy to run, and runs automatically in an offline environment not requiring a robot. In addition, the disclosed grasp generation method computes grasps which are based on a human's innate understanding of grasp posed required for a particular application, while allowing the human demonstration to be performed in a simple and intuitive manner.

Throughout the preceding discussion, various computers and controllers are described and implied. It is to be understood that the software applications and modules of these computers and controllers are executed on one or more computing devices having a processor and a memory module. In particular, this includes a processor in the robot controller 150 which controls the robot 100 performing the object grasping, and in the computer 160 which performs the human demonstration and grasp generation computations. As discussed earlier, different configurations of the system are possible, where the controller 150 or the computer 160 may be configured to perform operations such as the human demonstration calculations and identifying objects for grasping in real time operations.

While a number of exemplary aspects and embodiments of the technique for grasp teaching by human demonstration have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for teaching a grasp for use by a robotic grasping system, said method comprising:
providing an object model for an object to be grasped, and a gripper model for a gripper on a robot;
performing a demonstration of the grasp on the object by a hand of a human demonstrator;
analyzing images of the demonstration to identify a hand coordinate frame and a nominal gripper coordinate frame corresponding with the hand coordinate frame;
computing a grasp region on the object based on a position and orientation of the hand coordinate frame with respect to a pose of the object, including computing a hand plane from the hand coordinate frame, passing the hand plane through a point cloud of the object and selecting to include in the grasp region points on exterior surfaces of the object which meet criteria for proximity to the hand plane and an origin of a hand coordinate frame;
computing an optimized grasp for the grasp region and the nominal gripper coordinate frame, using a computer having a processor and memory;

repeating computing an optimized grasp with initial values of the nominal gripper coordinate frame randomized within a range, to produce a plurality of optimized grasps;

selecting a best one of the plurality of optimized grasps by comparing each of the optimized grasps with the hand coordinate frame and the grasp region; and outputting data defining the best one grasp to a grasp database.

2. The method according to claim 1 wherein the object model includes three-dimensional (3D) shape data for the object, and the gripper model includes 3D shape data and actuation parameters for the gripper.

3. The method according to claim 1 wherein analyzing images of the demonstration to identify a hand coordinate frame includes determining three-dimensional (3D) coordinates of key points of the hand including a base and a tip of a thumb and a forefinger, and computing the hand coordinate frame from the coordinates of the key points.

4. The method according to claim 1 wherein each of the optimized grasps comprises data defining the grasp including three-dimensional (3D) coordinates of a grasp target point, an angle of approach to be followed by the gripper, a gripper angle of rotation, a gripper width and a grasp quality value.

5. The method according to claim 1 wherein computing an optimized grasp includes computing the optimized grasp to have a locally-maximum grasp quality while satisfying constraint equations which define surface contact between the gripper and the grasp region of the object without gripper-object interference.

6. The method according to claim 5 wherein computing an optimized grasp includes using an iterative optimization formulated including a gripper surface defined in terms of sampling points on surfaces of the gripper model, and an object surface defined in terms of sampling points on surfaces of the object model in the grasp region, including a nearest neighbor point on the object surface corresponding with each of the sampling points on the gripper surface.

7. The method according to claim 6 wherein the iterative optimization is formulated including an objective function which maximizes the grasp quality defined based on a total distance between each sampling point on the gripper surface and its corresponding nearest neighbor point on the object surface in the target grasp region, where the constraint equations are treated as penalty functions whereby constraint violations reduce the grasp quality, and each iteration computes the transformation in one step using a least square linear algebra computation.

8. The method according to claim 1 wherein selecting a best one of the plurality of optimized grasps includes minimizing a cost function, where the cost function has terms calculating position and angle difference between the optimized grasp and the hand coordinate frame, and a term defined by an inverse of an overlap area between the optimized grasp and the grasp region.

9. The method according to claim 1 further comprising repeating steps from performing a demonstration of the grasp through outputting data defining the best one grasp to produce a plurality of grasps in the grasp database.

10. The method according to claim 1 further comprising using the grasp database during live robotic operations to identify a target object to grasp from a container of objects, including estimating object poses by comparing depth images from a 3D camera to the object model, identifying the target object by mapping grasps from the grasp database onto the estimated object poses, and providing target object grasp data to a robot controller which instructs a robot fitted with the gripper to grasp and move the target object.

11. A method for teaching a grasp for use by a robotic grasping system, said method comprising:

providing an object model including three-dimensional (3D) shape data for an object to be grasped, and a gripper model including 3D shape data and actuation parameters for a gripper on a robot;

performing a demonstration of the grasp on the object by a hand of a human demonstrator;

analyzing images of the demonstration to identify a hand coordinate frame, a hand plane and a nominal gripper coordinate frame corresponding with the hand coordinate frame;

computing a grasp region on the object by passing the hand plane through a point cloud of the object and selecting points on exterior surfaces of the object which meet criteria for proximity to the hand plane and an origin of a hand coordinate frame;

computing an optimized grasp for the grasp region and the nominal gripper coordinate frame, using a computer having a processor and memory, where the optimized grasp has a locally-maximum quality while satisfying constraint equations which define surface contact between the gripper and the grasp region of the object without gripper-object interference;

repeating computing an optimized grasp with initial values of the nominal gripper coordinate frame randomized within a range, to produce a plurality of optimized grasps;

selecting a best one of the plurality of optimized grasps by comparing each of the optimized grasps with the hand coordinate frame and the grasp region; and outputting data defining the best one grasp to a grasp database.

12. A robotic grasp generation system comprising:

a three-dimensional (3D) camera; and a computer having a processor and memory, said computer communicating with the 3D camera and configured to compute an optimized grasp based on human demonstration, where an object model for an object to be grasped and a gripper model for a gripper are provided to the computer, and a human uses a hand to perform the demonstration of the grasp on the object, and where the computer is configured to compute the optimized grasp, including;

analyzing images of the demonstration to identify a hand coordinate frame and a nominal gripper coordinate frame corresponding with the hand coordinate frame;

computing a grasp region on the object based on a position and orientation of the hand coordinate frame with respect to a pose of the object, including computing a hand plane from the hand coordinate frame, passing the hand plane through a point cloud of the object and selecting to include in the grasp region points on exterior surfaces of the object which meet criteria for proximity to the hand plane and an origin of a hand coordinate frame;

computing the optimized grasp for the grasp region and the nominal gripper coordinate frame;

repeating computing the optimized grasp with initial values of the nominal gripper coordinate frame randomized within a range, to produce a plurality of optimized grasps;

selecting a best one of the plurality of optimized grasps by comparing each of the optimized grasps with the hand coordinate frame and the grasp region; and outputting data defining the best one grasp to a grasp database.

13. The system according to claim 12 further comprising:
a robot controller; and
a robot fitted with the gripper to grasp and move a target object based on commands from the controller,
where the 3D camera provides depth images of a container of objects during live robotic operations, where the computer or the robot controller identifies the target object to grasp from the container of objects, including estimating object poses by comparing the depth images to the object model, and identifying the target object by mapping grasps from the grasp database onto the object poses.

14. The system according to claim 12 wherein the object model includes three-dimensional (3D) shape data for the object, and the gripper model includes 3D shape data and actuation parameters for the gripper.

15. The system according to claim 12 wherein analyzing images of the demonstration to identify a hand coordinate frame includes determining three-dimensional (3D) coordinates of key points of the hand including a base and a tip of a thumb and a forefinger, and computing the hand coordinate frame from the coordinates of the key points.

16. The system according to claim 12 wherein each of the optimized grasps comprises data defining the grasp including three-dimensional (3D) coordinates of a grasp target point, an angle of approach to be followed by the gripper, a gripper angle of rotation, a gripper width and a grasp quality value.

17. The system according to claim 12 wherein computing an optimized grasp includes computing the optimized grasp to have a locally-maximum grasp quality while satisfying constraint equations which define surface contact between the gripper and the grasp region of the object without gripper-object interference.

18. The system according to claim 12 wherein selecting a best one of the plurality of optimized grasps includes minimizing a cost function, where the cost function has terms calculating position and angle difference between the optimized grasp and the hand coordinate frame, and a term defined by an inverse of an overlap area between the optimized grasp and the grasp region.

* * * * *